FIG. 1

INVENTOR.
JOHN M. SLATER

INVENTOR.
JOHN M. SLATER
BY
Allan Rottenberg
ATTORNEY

Nov. 1, 1960 J. M. SLATER 2,958,522
SECTIONAL STABLE PLATFORM

Filed Nov. 12, 1957 10 Sheets-Sheet 6

FIG.7

INVENTOR.
JOHN M. SLATER

BY Allan Rothenburg

ATTORNEY

FIG. 9

INVENTOR.
JOHN M. SLATER
BY
ATTORNEY

Nov. 1, 1960

J. M. SLATER 2,958,522

SECTIONAL STABLE PLATFORM

Filed Nov. 12, 1957

INVENTOR.
JOHN M. SLATER

BY Allan Rothenberg

ATTORNEY

United States Patent Office 2,958,522
Patented Nov. 1, 1960

2,958,522

SECTIONAL STABLE PLATFORM

John M. Slater, Fullerton, Calif., assignor to North American Aviation, Inc.

Filed Nov. 12, 1957, Ser. No. 695,869

20 Claims. (Cl. 73—504)

This invention relates to stable platforms and particularly concerns a spatial reference system embodying a plurality of mutually remote and relatively movable platform sections for providing orientation reference about a plurality of axes.

Inertial guidance systems typically utilize a plurality of acceleration sensing devices to measure vehicle accelerations along a set of two or more orthogonal axes and a plurality of gyroscopes to define a set of three orthogonal reference axes having some definite relation to inertial space. Inertial or unaccelerated space is in effect the space defined by the fixed stars as distinguished, for example, from the surface of the rotating earth. A computer is normally provided which takes into account earth rotation, gravity and other factors in such a manner that the outputs of the acceleration sensing devices can be interpreted correctly as changes of motion of the vehicle. Then a single integration of acceleration signals will give vehicle velocity components along a set of predetermined axes and a double integration will give displacement or distance traveled with reference to such axes.

In conventional inertial systems the gyroscopes are assembled on a unitary device commonly designated as a stable element which is intended either to retain an angularly fixed (irrotational) relation to inertial space or alternatively, to rotate in space in some predetermined manner such as, for example, in synchronism with earth rotation. The acceleration sensing devices are mounted on the stable element and therefore sense accelerations in a coordinate system fixedly related to the element. The stable element, the assemblage of gyroscopes and acceleration sensing devices, is mounted as a single unit in gimbals in order to enable it to retain its orientation in inertial space completely independently of vehicle maneuvers. The gimbal mounted stable element is commonly designated a stable platform. Typical stable platforms for inertial guidance are described in an article by J. M. Slater and D. B. Duncan, "Inertial Navigation," Aeronautical Engineering Review, volume 15, No. 1, January 1956, p. 49.

The conventional arrangement has the principal advantage of facilitating alignment of the several inertial elements relative to each other as they are all mounted on the same stable element. The conventional arrangement is nearly an ideal one, for applications wherein size, weight and cost considerations can be subordinated to that of maximized accuracy. However, such arrangement has certain disadvantages for applications wherein dimensions and weights are critical, as in the case of most ballistic missiles and also high-performance airplanes of fighter type.

The shape of the platform is inherently spheroidal, making for difficulties in packing it into an airplane or other vehicle. A number of highly critical elments have to be located as close together as possible which makes individual shielding and other environmental controls difficult. Further, a large number of slip rings must be concentrated on a single azimuth shaft. As a result of these inherent limitations, it turns out that when a platform of conventional construction must be adapted for a small space (say 6 to 10 inches diameter) and light weight, the critical components (gyroscopes and accelerometers) have to be reduced in size to an extent such that their performance is seriously affected. The problem of providing precision inertial guidance for ballistic missiles and for fighter airplanes is at present a very critical one; and, to a considerable extent, for the reason mentioned.

The present invention overcomes the above stated disadvantages and achieves new advantages by the provision of an inertial system wherein the inertial elements are mounted in separate subassemblies which are free to move relative to one another and which are maintained in the proper orientation relative to each other by means of remote coupling or slaving links. The advantages of this arrangement of a sectional stable platform are numerous. The shape of the overall assembly may be inherently cylindrical, thinner and longer than the shape of a conventional stable platform using the same inertial elements. This facilitates mounting of the system in a vehicle which is itself inherently cylindrical. The inertial elements are separated into a plurality of quasi-independent assemblies which may be of relatively simple and symmetric nature. Individual shielding and environmental control of the inertial elements are facilitated. Furthermore, since a plurality of independent azimuth shafts are utilized, the number of slip rings on each is materially reduced, thus considerably simplifying the fabrication. Also, in manufacturing, one can operate two simultaneous production lines on essentially similar and relatively simple subassemblies, a distinguished from a single production line on a relatively complex assembly.

In accordance with the invention, there is provided a sectional attitude reference platform having a plurality of relatively movable stabilized platform sections and remote coupling means for maintaining a predetermined relative orientation of the sections. Each platform section is capable of independent pivotal motion relative to each other section and each is individually stabilized about at least one axis. In one embodiment of the invention a first platform section is gyroscopically stabilized about two mutually orthogonal axes while a second platform section is stabilized by its own gyroscope about a third axis normal to the two axes of the first platform section. The desired relative orientation of the gyroscopic stabilizing means on the two sections is maintained by means of mechanical or electromechanical servo links. Thus, the first section which itself directly affords a stable reference about two axes indirectly affords a stable reference about a third axis by being itself remotely stabilized about such third axis from the second platform section which is directly stabilized about such third axis.

For application as an inertial navigator, inertial devices such as accelerometers which must be maintained in a known attitude may be mounted on one or more of the platform sections and thus maintained in a known relation to inertial space. The fundamental concept of a plurality of individually stabilized platform sections slaved in a predetermined relative orientation is illustrated in connection with several different arrangements for individually stabilizing each of the platform sections.

It is an object of this invention to provide an improved stable platform.

Another object of this invention is to provide an improved inertial navigator.

Still another object of this invention is the provision of an inertial system having an arrangement of inertial components which may be varied to suit a particular application.

A further object of the invention is to facilitate the packaging of an inertial system.

Still another object is the provision of an inertial reference system having a plurality of relatively movable sections.

A further object is to maintain a predetermined orientation of several independently mounted gyroscopes.

Another object is to maintain a predetermined orientation of several inertial elements relative to each other without a common unitary mount therefor.

These and other objects of the invention will become apparent from the following description taken in connection with the accompanying drawings, in which.

Figure 1:
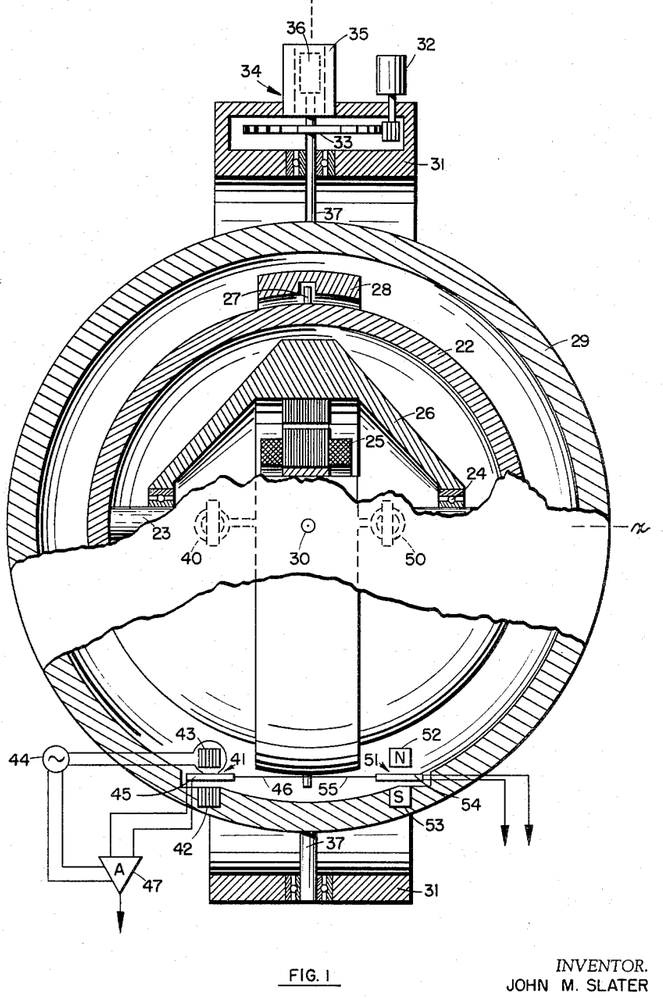
Fig. 1 is a diagrammatic illustration of an exemplary two-axis gyroscope which may be utilized with this invention.

The apparatus shown in Fig. 2 incorporates a pair of substantially conventional two-axis gyroscopes 20 and 21 which will be briefly described in connection with Fig. 1 in order to afford a better understanding of the ensuing description of the system itself. Gyroscope 20 is shown in Fig. 1 as a typical two-axis gyroscope with followup gimbals. The gyroscope is shown in a diagrammatic manner and contains nothing that is novel in itself. It should be understood that any one of many conventional and well-known two-axis gyroscopes may be utilized. A spherical hermetically sealed rotor case 22 mounts a shaft 23 carrying a rotor 26 on ball bearings 24 and a centrally located drive motor 25. Rotor case 22 is mounted by bearings 27 in a gimbal ring 28 which is supported relative to an outer spherical case 29 by bearings 30. Bearings 27 and 30 may be of pivot and jewel, liquid lubricated or other low friction type, and the space between spherical rotor case 22 and the spherical outer case 29 may be filled with a dense flotation liquid to take most of the load off the bearings. The outer case 29 is supported for rotation about axis z relative to a mounting ring 31 which constitutes one of the gimbals of one platform section in the apparatus of Fig. 2. The rotation axis z is provided with a servo motor 32 mounted on ring 31 which drives outer case 29 via gearing 33. Also mounted on the axis z is a conventional three-phase synchro 34 having a stator 35 fixed to ring 31 and a rotor 36 fixed to shaft 37 which in turn is secured to outer case 29. The gyroscope has substantially similar pickoffs 40 and 41 for detecting precession or tilt about y and z axes respectively between rotor case 22 and outer case 29. The two pickoffs may be identical except for orientation and location. Pickoff 41, for example, comprises a fixed A.-C. excited field structure including spaced elongated cores 42, 43 fixed to case 29 and having series wound coils thereon excited from A.-C. source 44 so as to provide elongated magnets having adjacent magnetic poles of opposite polarity at any instant. A flat coil 45 is fixed by means of a rigid arm 46 to the pivot of rotor case 22 for rotation therewith about the z axis, intermediate cores 42, 43. The oppositely poled magnetic poles of the cores thus generate oppositely directed fluxes through diametrically opposite portions of flat coil 45. These fluxes are summed in the flat coil. At null position the algebraic sum of oppositely directed fluxes is zero and no current flows in the coil 45. If the coil be displaced from its null position by relative rotation of the two spherical cases, the flux in one of the two diametrically opposite portions thereof will be greater than the flux across the other of such portions and a current will be induced in coil 45 in accordance with the difference between such flux portions. The current will have a magnitude and phase relative to the phase of source 44 which are indicative of the magnitude and sense of the displacement of the flat coil 45. The output of the coil 45 is fed to an amplifier demodulator 47 which provides a D.-C. output having a magnitude and polarity proportional to the amount and sense of the displacement between the two cases. The amplifier demodulator 47 is, of course, phase referenced from source 44.

The y axis pickoff 40 similarly comprises a pair of A.-C. excited elongated cores (only one of which is shown) fixed to case 29 and a flat coil fixed to inner gimbal ring 28 for rotation therewith and with rotor case 22 about the y axis.

The gyroscope may be provided with a pair of control torquers 50, 51 which are similar in appearance to the pickoffs. The z axis torquer 51, for example, may comprise a pair of C-shaped permanent magnets 52, 53 which are fixed to outer case 29 and have adjacent magnetic poles of opposite polarity. A flat coil 54 is fixed by means of arm 55 to the z axis pivot of rotor case 22 for rotation therewith between the magnets 52 and 53. A D.-C. control torque signal applied to the coil 54 sets up a D.-C. flux in the coil which creates a force tending to align the center of the coil with the flux flowing from one core to the other core at a selected end of the core pair. For example, with a control torque signal of one polarity in coil 54, the coil will move upwardly out of the plane of the paper toward the upper ends of cores 52 and 53 labeled north and south respectively. With a control torque signal of opposite polarity in coil 54 the coil will move in the opposite direction and thus the rotor case 22 may be torqued about the z axis in the appropriate direction selected by the polarity of the control torque signal. The y axis torquer 50 is substantially identical except for orientation. It may comprise a pair of permanent magnets (only one of which is shown) fixed to outer case 29 and a flat coil fixed to inner gimbal ring 28 for rotation therewith about the y axis intermediate the permanent magnets of the torquer.

Figure 2:
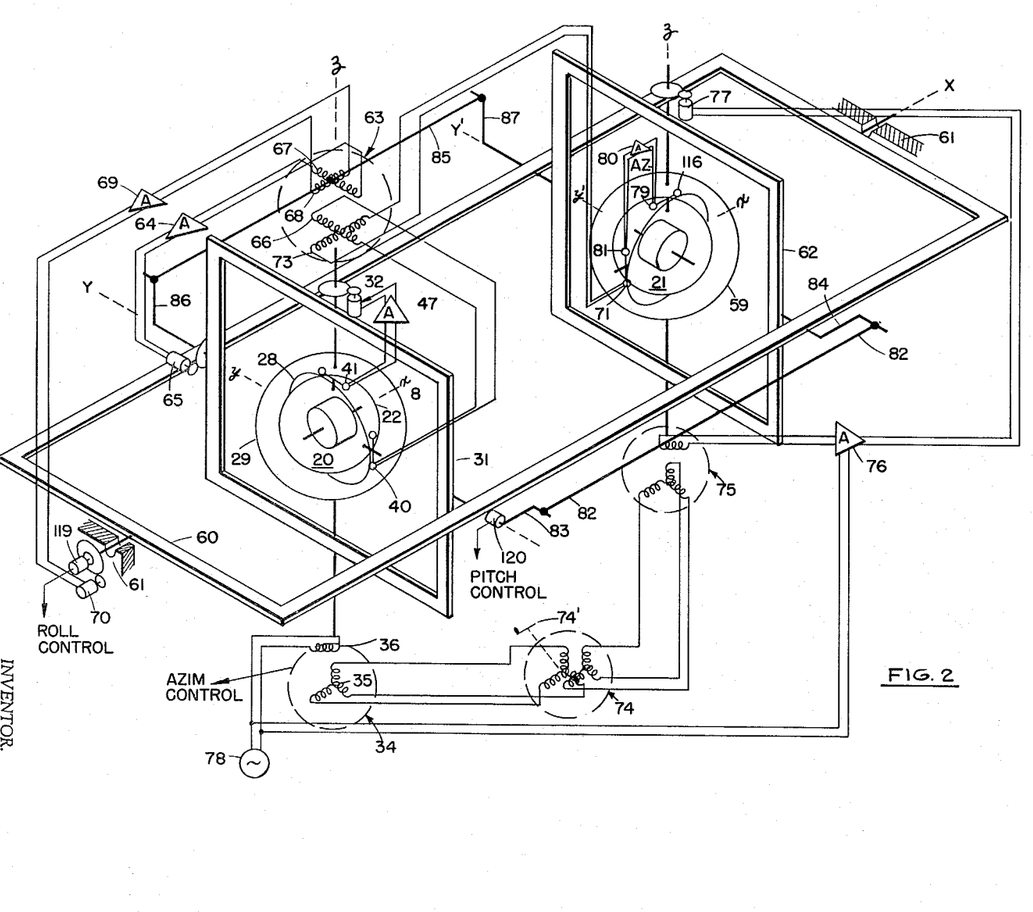
Fig. 2 is a diagrammatic illustration of one embodiment of the invention.

As shown in Fig. 2, the sectional platform comprises a first platform section formed by the outer case 29 of gyroscope 20 and a three-axis mounting for the case while the second platform section comprises the outer case 59 of two-axis gyroscope 21 and a similar three-axis mounting for the case. The case 29 is mounted for azimuth freedom in gimbal 31 which in turn is mounted for pitch freedom about the Y axis in a roll gimbal 60 pivoted about X axis to a fixed base member 61 which may be the airframe itself or any suitable frame, plate or other support fixed to the craft which is to carry the inertial system. Similarly the outer case 59 of gyroscope 21 is mounted for azimuth freedom in pitch gimbal 62 which is pivoted for pitch freedom in roll gimbal 60 common to the two platform sections.

Gyroscope 20 stabilizes its outer case 29 about two axes y, z. The z axis pickoff 41 detects misalignment of the case 29 relative to the gyroscope rotor about the z axis and feeds a signal through amplifier demodulator 47 to servo motor 32 which rotates case 29 relative to gimbal 31 in amount and direction to null the detected misalignment. The y axis pickoff 40 detects misalignment of the case 29 relative to the gyroscope about the y axis and feeds a signal through resolver 63 and amplifier demodulator 64 to servo motor 65 on roll gimbal 60 to rotate gimbal 31 and thus case 29 about the Y axis in a sense to null the detected misalignment. Just as in the conventional stable platforms, the control system for the platform gimbals in roll and pitch must take into account the fact that the gyroscopes are stabilized in azimuth and hence will change their orientation relative to the roll and pitch axes X and Y. In the particular orientation shown, the gyroscopes are azimuth oriented in the azimuth orientation of the pitch and roll gimbals so that, for example, the y axis of the gyroscope is aligned with the Y axis of the pitch gimbal. Therefore, the signal from pickoff 40 may be fed directly to pitch servo motor 65 through aligned coils 66 and 67 of the resolver 63. However, if the craft carrying the inertial apparatus were to change its azimuth attitude (turn about z axis), any rotation between the case 29 and gyroscope 20 about y axis would have components along the Y and X axes. In this instance, solely the component along the Y axis is coupled through resolver coils 66 and 67 to Y axis servo motor 65. Additionally, the X axis component is coupled from rotor coil 66 of the resolver to the quadrature stator coil 68 which then feeds the X axis component through amplifier demodulator 69 to X axis servo motor 70 mounted on base 61 to rotate roll gimbal 60, pitch gimbal 31 and case 29 about the X axis in accordance with the X axis component of the deviation of case 29 about the y axis. Fundamentally, however, gyroscope 20 stabilizes case 29 about the two axes which are mutually orthogonal to each other and to the spin axis of the gyroscope.

Gyroscope 21 will stabilize its case 59, in the orientation shown, about the roll axis X. Pickoff 71 detects misalignment between the gyroscope and case 59 about the x axis of gyroscope 21 and feeds a signal through resolver 63 and amplifier demodulator 69 to servo motor 70 which rotates roll gimbal 60, pitch gimbal 62 and case 59 in a sense to null the detected misalignment. The signal from pickoff 71 of gyroscope 21 has the X axis component thereof coupled through rotor coil 73 of the resolver to stator coil 68 thereof. The Y' axis component of the signal from pickoff 71 (upon azimuth deviation of the gyroscope from the orientation shown) is coupled from rotor coil 73 to stator coil 67 which then affords a component of Y axis control of gimbal 31 and case 29 of gyroscope 20.

In the embodiment shown, the two gyroscopes have mutually orthogonal and level spin axes and each will effect stabilization about the two axes perpendicular to its rotor spin axis. Thus, both gyroscopes will tend to establish an azimuth reference and either their signals must be averaged to control the platform as a whole or one must be made master and the other slave. The latter arrangement is illustrated. The azimuth reference established by gyroscope 20 (which in this case is the master gyroscope) is detected by synchro 34 having a rotor 36 fixed for rotation with case 29 about the z axis and excited by A.-C. source 78 and a three-phase stator 35 fixed to ring 31. The azimuth signal from synchro 34 is fed through differential synchro 74 to synchro 75 having its rotor fixed for rotation with case 59 and its stator fixed to gimbal 62. The signal from the rotor of synchro 75 is fed through amplifier demodulator 76, phase referenced from source 78, to servo motor 77 on ring 62 which rotates case 59 to null the signal in the rotor of synchro 75 whereby the azimuth orientation of case 59 is slaved to the azimuth orientation of case 29. Gyroscope 21 is azimuth caged to its case by means of pickoff 79 which detects azimuth deviation between the gyroscope rotor and case 59 and feeds a signal through amplifier demodulator 80 to x axis torquer 81 which torques the gyroscope to cause azimuth precession in a sense to null the azimuth deviation detected by pickoff 79. Thus, the spin axis of gyroscope 21 is azimuth slaved at right angles to the spin axis of the gyroscope 20. Differential synchro 74 is utilized as a setting device for initially establishing the required 90° relation between the spin axes of the two gyroscopes. The differential synchro is initially set by hand as by handle 74', for example, to establish the desired relation.

Roll slaving, the maintaining of the desired alignment of the two gyroscopes about the common x axis is effected by the common roll gimbal 60 although it will be readily appreciated that a pair of independent roll gimbals may be provided, one for each platform section, with x axis slaving provided by mechanical or electromechanical links. Pitch slaving, maintaining the two gyroscopes in the desired orientation about the parallel Y and Y' axes of gimbals 31, 62, is effected by a rigid slave link 82 pivotally connected at each end thereof to pitch slave arms 83 and 84 which are rigidly connected to gimbals 31 and 62 respectively for rotation therewith about the respective Y and Y' axes. To avoid an inoperative dead center position, a second pitch slave link 85 may be provided pivoted at the opposite ends thereof to pitch slave arms 86 and 87 fixed to the pivot axes of gimbals 31 and 62 respectively. It is noted that the arm pair 86, 87 is orthogonally related to the arm pair 83, 84.

From the preceding description, it will be seen that gyroscope 20 basically stabilizes its platform section 29 about the Y and z axes (in the orientation shown) while gyroscope 21 stabilizes its platform section 59 about the x axis which is maintained aligned with or parallel to the spin axis of gyroscope 20. The platform section 29 is stabilized about the third axis thereof by means of the x axis reference established by gyroscope 21. The platform section 59 which is stabilized by its own gyroscope 21 about the x axis is maintained in proper orientation relative to the platform section 29 by the pitch slave links 82, 85 and the azimuth slave link comprising synchro 34, synchro 75 and servo motor 77. Gyroscope 21 is azimuth slaved to its platform section by means of pickoff 79 and torquer 81. Thus, each platform section is effectively stabilized about three axes partly by its own gyroscope and partly by the gyroscope of the other section. The two platform sections are respectively stabilized about two sets of axes which are linearly displaced relative to one another along the X axis.

Figure 3:
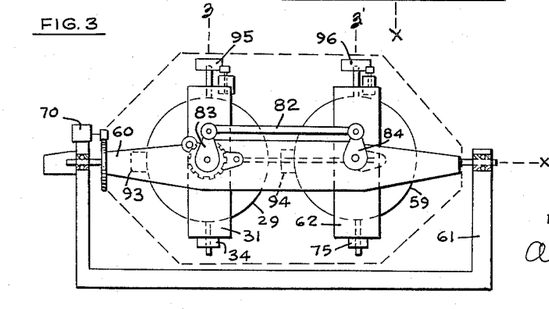
Fig. 3 is an elevational view of the mechanical components of Fig. 2.
Figure 5:
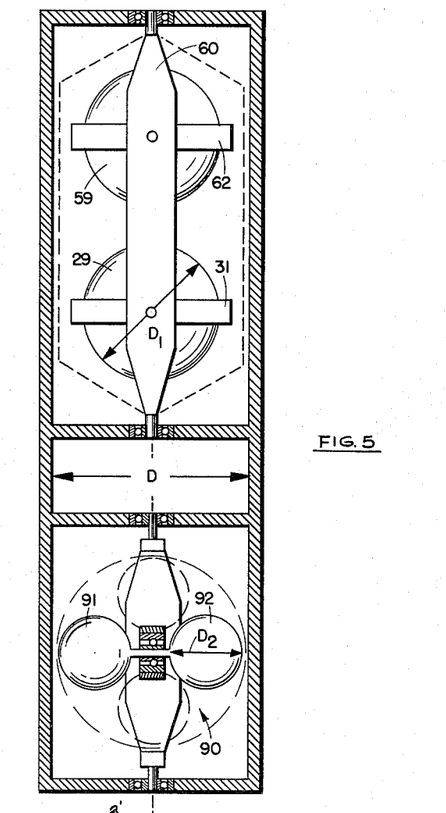
Fig. 5 illustrates the advantages of gyroscope size obtained with a sectional platform.

Shown in Fig. 3 is a side view of the sectional platform of Fig. 2 illustrating approximately the relative sizes and disposition of the various mechanical components. The dotted lines indicate approximately the space swept out by the platform components during maneuvers of an airframe to which the base or frame 61 may be fixedly mounted. The dotted lines thus indicate the clearance space which must be provided. It will be noted that the preferred mechanical configuration of the roll gimbal 60 is tapered at both ends thereof. In general, the tandem type of platform illustrated will be slightly longer than a conventional platform utilizing the same two-axis gyroscopes, but will be reduced in effective diameter by approximately the diameter of a single gyroscope. This particular essentially cylindrical configuration is much more than of merely superficial interest because of the pronounced cylindrical configuration of most unmanned and some manned aircraft. In particular, unmanned airframes are becoming longer and of decreasing diameter as the state of the art progresses. Similar improvements in presently available gyroscopes, insofar as reduction in size without compromise of performance is concerned, are not presently available. Thus, since the gyroscope size can not be reduced in proportion to the decreasing size of the available airframes, the sectional platform of the present invention enables the packaging of gyroscopes of a relatively large size in the available cylindrical space of relatively small diameter. The size advantage available with the disclosed sectional platform is illustrated in Fig. 5 wherein a cylinder of diameter D is assumed to define the available space for the inertial system. A conventional unitary stable platform 90 incorporating two two-axis gyroscopes 91, 92 will require a spherical space somewhat greater than twice the diameter $D_2$ of each of its gyroscopes as the vehicle maneuvers and changes its spatial orientation about an axis (pitch) perpendicular to the plane of the paper. Thus, as is common, when the airframe changes its pitch attitude by 90°, the gyroscopes 91, 92 which are stabilized in space will be oriented as shown in dotted lines. In the sectional platform of this invention, on the other hand, each gyroscope may have a diameter $D_1$ substantially double the diameter of the gyroscopes of a conventional platform. This is possible by reason of the fact that during pitch maneuvers, for example, the two gyroscopes and the two platform sections will rotate independently in pitch and not as a unit. It is noted that the maximum gyroscope diameter in any case is somewhat less than the diameter of the available cylindrical space because of the several gimbals, synchros, servo motors and the like (not shown in Fig. 5). Thus, for a given available space, a sectional platform of the present invention can utilize gyroscopes of approximately double the size of those available for use with a conventional platform. As is well known, the accuracy and many other desirable characteristics of a gyroscope will increase with size thereof, up to a limit. In the present state of the art the optimum gyroscope size, expressed in terms of rotor angular momentum at 200 r.p.s. (typical operating speed), is approximately in the range 1 to 20 million gm.-cm.$^2$-rad.-sec.$^{-1}$. This corresponds to instruments represented roughly by 4-inch to 6-inch spheres. With smaller gyroscopes, accuracy falls off more or less linearly with angular momentum, whereas with gyroscopes that are very much larger, the effect of mass increasing faster than structural rigidity may result in a net decrease in accuracy especially under multi-g acceleration conditions.

For use as in inertial navigators, the stable platform will carry a plurality of inertial devices such as accelerometers, velocity meters or distance meters all of which basically sense acceleration along a predetermined axis thereof. (A velocity meter is a single integrating accelerometer and a distance meter is a double integrating accelerometer.) Illustrated in Fig. 3 are exemplary locations of such accelerometers. Accelerometers 93 and 94 are shown as affixed directly to the outer cases 29 and 59 respectively. Their sensing axes may be along $x$ and $y$ axes respectively. Alternatively accelerometers such as indicated at 95 and 96 may be mounted directly to the azimuth shafts of platform sections 29 and 59 respectively. Again, the accelerometer axes are mutually orthogonal and preferably level. Any one or more of accelerometers 93 through 96 may be utilized as the application demands.

Figure 4:
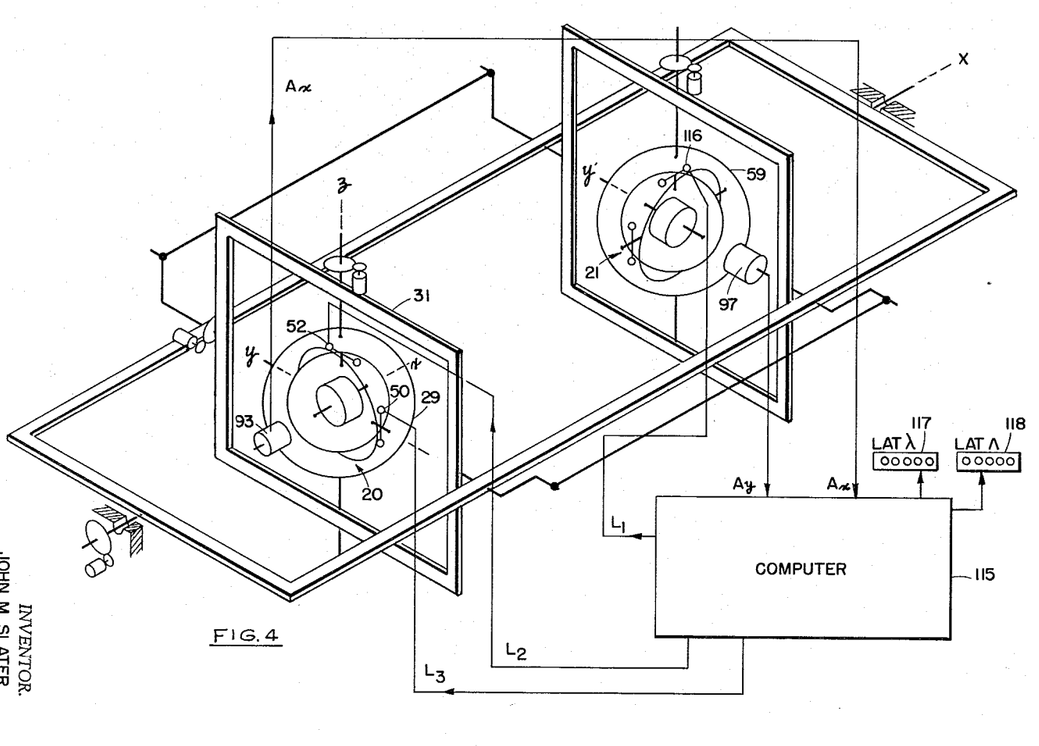
Fig. 4 is a diagrammatic illustration, with certain parts omitted, showing the adaptation of the apparatus of Fig. 1 to an inertial navigator.
Figure 15:
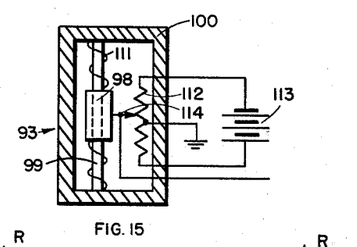
Fig. 15 illustrates an exemplary accelerometer.

The application of the system of Figs. 2 and 3 to a typical inertial navigator is shown in Fig. 4 which shows a portion of the apparatus of Fig. 2 with certain additions. There is provided an accelerometer 93 fixedly mounted to case 29 and thus stabilized about $y$ and $z$ axes by gyroscope 20. The sensing axis of the accelerometer 93 is along the $x$ axis. A second accelerometer 97 fixedly secured to outer case 59 has its sensing axis disposed along the $y$ axis of gyroscope 21 and is stabilized by its platform section 59 about the $x$ and $z$ axes. The accelerometers may either be directly attached to the respective platform cases 29 or 59 or alternatively may be mounted on the ends of the azimuth shafts which pivotally mount the cases to the pitch gimbals 31 and 62. There is assumed a latitude-longitude system in which the accelerometers are to be maintained level with accelerometer 93 sensing North, South accelerations and accelerometer 97 sensing East, West accelerations. The accelerometers may be of the type giving an output proportional to acceleration or to the first or second time integral of acceleration. A non-integrating accelerometer is selected for purposes of illustration and as shown in Fig. 15 may basically comprise a mass 98 slidably constrained for movement along a shaft 99 fixed to accelerometer case 100 and spring restrained by a spring 111. A potentiometer 112 fixed to case 100 is center tapped and excited by a suitable source of electric potential 113. A wiper arm 114 carried by mass 98 cooperates with potentiometer resistance 112 to provide an output signal between the arm 114 and the potentiometer center tap which is proportional to the displacement of the mass 98. The case 100 may be filled with a suitable fluid for damping purposes. Assuming linearity of the spring and potentiometer and negligible friction, the electrical output will be proportional in sense and magnitude to acceleration sensed along the axis of shaft 99.

The outputs $A_x$, $A_y$ of accelerometers 93 and 97 are thus indicative of sensed accelerations along North-South and East-West axes. The accelerometer signals are fed to a computer 115, more particularly described below, which integrates the signals to yield $V_x$ and $V_y$ the North-South and East-West components of velocity. The computer divides $V_x$ by earth radius R to obtain $V_x/R$ (the rate of change of latitude, $\dot{\lambda}$) and divides $V_y$ by R cos $\lambda$ to obtain $V_y/R$ cos $\lambda$ which is the rate of change of longitude $\dot{\Lambda}$. It is to be understood that the specific details of the computer itself form no part of this invention since many types of either analog or digital computers well known to those skilled in the art may be utilized to perform the above described computations and the other computations which may be required.

In order to remain level and in the local meridian plane, the gyroscopes must be torqued in accordance with the following expressions wherein $\Omega$ is the angular velocity of the earth about its axis, L is torque, and H is gyroscope angular momentum:

$$L_1 = H(\Omega_x + \dot{\Lambda}_x) = H(\Omega + \dot{\Lambda}) \cos \lambda \quad (1)$$

$$L_2 = H\dot{\lambda} \quad (2)$$

$$L_3 = H(\Omega_z + \dot{\Lambda}_z) = H(\Omega + \dot{\Lambda}) \sin \lambda \quad (3)$$

Accordingly, the computer performs the necessary computations involving $\Omega$, $\dot{\Lambda}$, $\lambda$ and generates the desired gyroscope torques. The $z$ axis torquer 52 of gyroscope 20 is supplied with the torque $L_2$ in order to effect precession about the $y$ axis in accordance with the rate of change of latitude sensed by the accelerometer. The $y$ axis torquer 50 of gyroscope 20 is supplied with the torque $L_3$ from the computer in order to effect azimuth rotation in accordance with the vertical component of the vector representation of earth angular velocity about its axis and sensed vertical component of the vector representing rate of change of longitude. The $z$ axis torquer 116 of gyroscope 21 is fed with the torque $L_1$ in order to cause precession about the $x$ axis in accordance with the horizontal component of the vectors representing earth rate and rate of change of longitude. Thus, it will be seen that the sectional stable platform maintains itself and the accelerometers mounted thereon in a local earth level and a predetermined azimuth orientation at all times.

The quantities $\lambda$ and $\Lambda$ latitude and longitude, respectively, are obtained by integrating the quantities $\dot{\lambda}$ and $\dot{\Lambda}$ in a separate pair of integrators provided in the computer and latitude and longitude may thus be indicated in any suitable display device such as indicators 117, 118.

Figure 16:
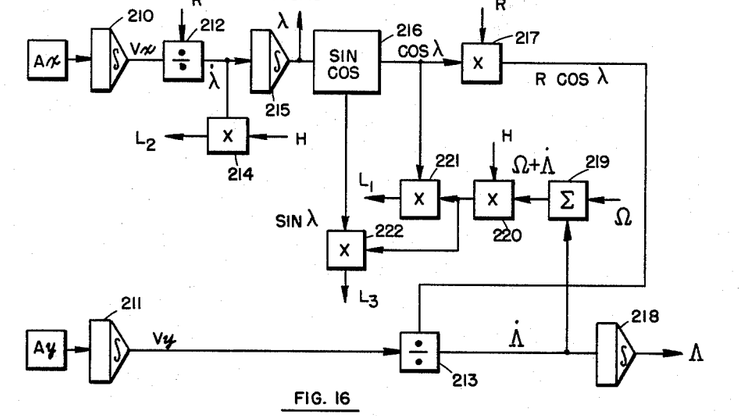
Fig. 16 is a block diagram of an exemplary computer.

As indicated in the block diagram of Fig. 16, the computer 115 may comprise a number of conventional computing circuits connected as illustrated. The accelerometer signals A$x$ and A$y$ are integrated in integrators 210, 211 to provide the velocity signals V$x$ and V$y$ which are divided in dividers 212, 213 by the quantities R (a constant voltage input) and R cos λ to obtain the signals λ̇ and Λ̇ respectively. The signal λ̇ from divider 212 is multiplied by a constant voltage input of magnitude H in multiplier 214 to yield the D.-C. control torque signal L$_2$. The output of divider 212 is also integrated in integrator 215 to provide the signal λ which forms one of the computer outputs and is further fed to resolver 216 to yield the signals cos λ and sin λ. The quantity R cos λ is derived as the output of multiplier 217 which has as the two inputs thereof the signals cos λ from resolver 216 and the fixed quantity R. The output Λ̇ of divider 213 is integrated in integrator 218 to provide the longitude signal Λ as one of the computer outputs. The signal Λ̇ is also fed to summing network 219 together with a constant voltage representing earth rate Ω to provide the sum of the two inputs thereto which is multiplied in multiplier 220 by the constant angular momentum quantity H. The output of multiplier 220, H (Ω+Λ̇), is multiplied in multiplier 221 by the quantity cos λ from resolver 216 to provide the D.-C. control torque signal L$_1$. The output of multiplier 220 is also multiplied in multiplier 222 by the quantity sin λ from resolver 216 to provide the D.-C. control torque L$_3$.

The use of the scale factor 1/R in the feedback of the integrated acceleration signals to the gyroscopes gives each of the two assemblies (gyroscope, accelerometer and feedback) the properties of an oscillatory pendulous system of period $T=2\pi(R/g)^{1/2}$ where R is earth radius and g. is acceleration of gravity. This is the so-called Schuler period, the significance of which is well known to those skilled in the art. The inertial navigator of Fig. 4 is in effect two separate and more or less independent single axis Schuler tuned systems or artificial Schuler pendulums slaved together in quadrature relation. In the conventional stable platform, the two Schuler tuned pendulous systems are part of the same physical element.

As indicated in Fig. 2, attitude reference signals may be derived from the previously described azimuth pickoff synchro 34 and similar roll and pitch synchros 119 and 120. The roll synchro 119 has its rotor fixed to the X axis pivot of roll gimbal 60 while its stator is fixed to the base member 61. The pitch axis synchro 120 has its stator fixed to roll gimbal 60 while its rotor is fixed to the pitch axis pivot of gimbal 31.

Figure 14:
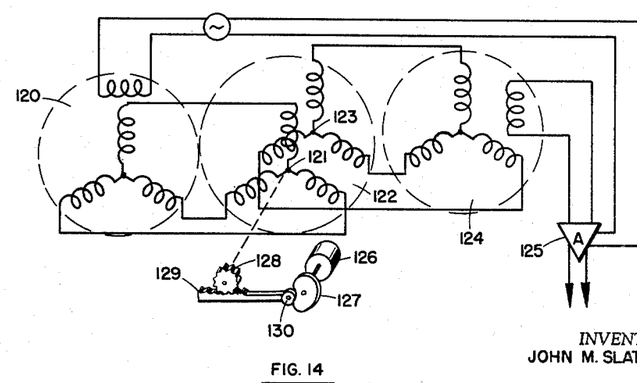
Fig. 14 shows a typical synchro pickoff and programmer.

A typical synchro system is illustrated in Fig. 14 in connection with the desired programming of the controlled vehicle in pitch. The three-phase stator of synchro 120 may be coupled with a three-phase rotor 121 of a differential synchro 122 which has its three-phase stator 123 coupled to the three-phase stator of a locked synchro 124. The locked synchro is substantially similar to synchro 34 except that its rotor is mechanically fixed against rotation relative to its stator and thus in effect comprises a three-phase to one-phase converter. The rotor of synchro 120 fixed to the pitch pivot of gimbal 31 is excited from a suitable A.-C. source utilized as a phase reference for an amplifier demodulator 125 which is fed with the signal from the rotor of the locked synchro. The output of the amplifier demodulator is thus a D.-C. signal indicative of the pitch deviation of the airframe from Y axis established by the sectional platform and may be supplied to the vehicle pitch controls which may comprise aerodynamic surfaces, swivel rocket motors, jet vanes or the like. A pitch program motor 126 drives at constant speed a pitch cam 127 which has the surface thereof cut in accordance with the desired pitch attitude. The cam effects rotation of the three-phase rotor 121 of the differential synchro 122 via gear 128, rack 129 and cam follower 130. Thus, the output of the amplifier demodulator is the algebraic sum of the rotation imparted to the rotor of synchro 120 and the rotation of the rotor of the differential synchro. The azimuth and roll control signals may be derived from similar circuitry although the differential synchro and its programming apparatus may be eliminated if programming in azimuth and roll is not desired.

Figure 6:
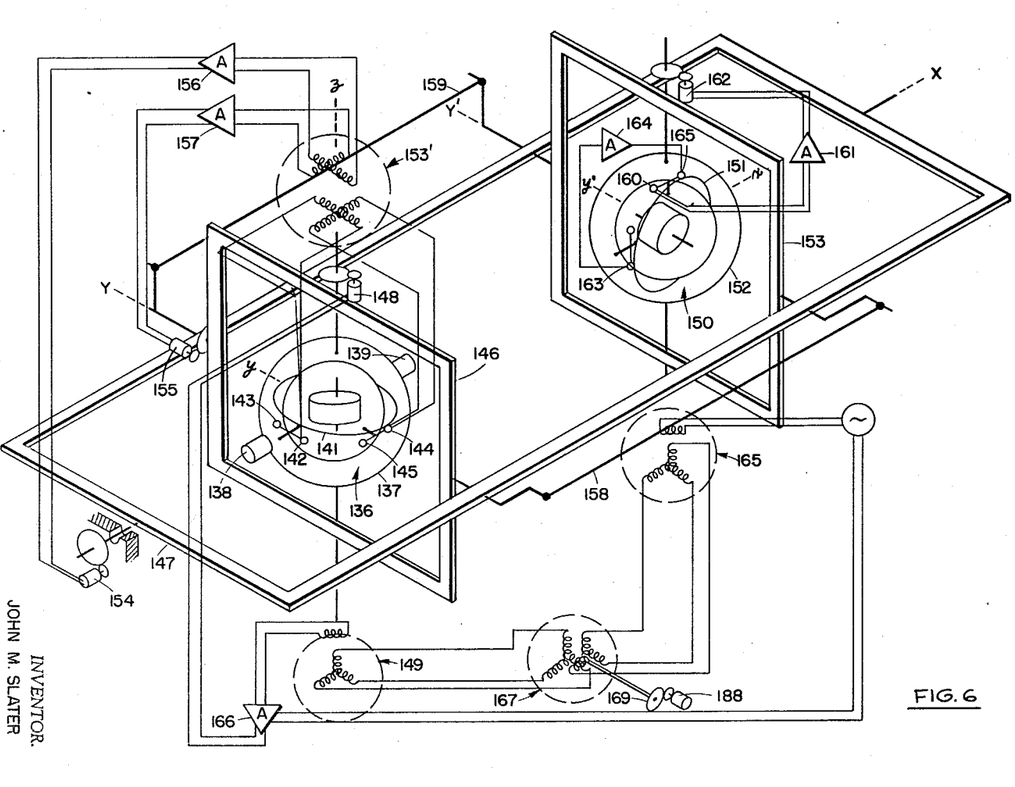
Fig. 6 is a diagrammatic illustration of a second embodiment.
Figure 7:
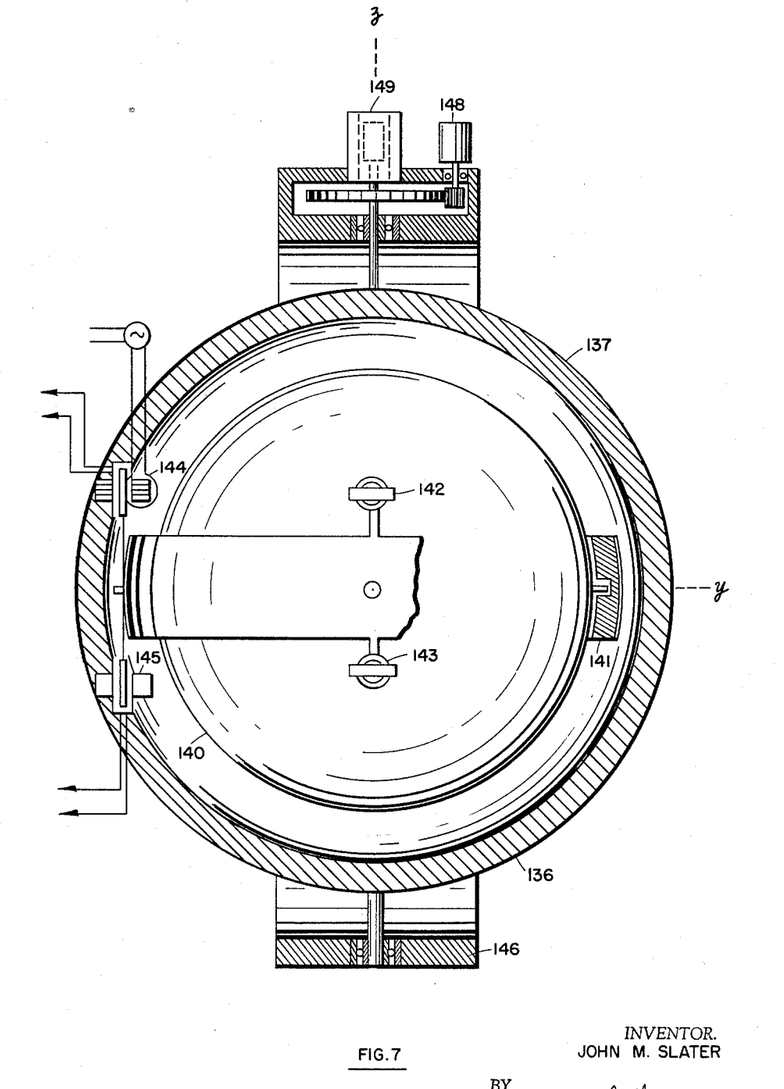
Fig. 7 illustrates a typical gyroscope which may be utilized with the apparatus of Fig. 6.

The configuration shown in Fig. 2 wherein both gyroscope spin axes are horizontal is ordinarily the best, strictly from the point of view of gyroscope performance, since gyros in the position shown are not subject to disturbing gravity moments due to gravity acting on some mass in the floated element. However, for use of a latitude, longitude system with the configuration of Fig. 2, the high longitude rates which would be required for operation in or about the polar regions are exceedingly difficult to obtain by torquers. For this reason it is desirable to introduce longitude rates as rotations rather than torques if a latitude longitude system is to be operated near polar regions. Illustrated in Fig. 6 is a modification of the sectional platform of Fig. 2 which is particularly adapted to receive vertical components of angular velocity due to earth rotation and rate of change of longitude. The horizontal velocity components will be introduced as torques as described in connection with Fig. 2. In the system of Fig. 6 the spin axis of gyroscope 136 of a first platform section is made vertical. This platform section, the outer case 137 of the gyroscope, has fixedly secured thereto both of the accelerometers 138 and 139 which are maintained level and oriented North-South and East-West, for example, by the sectional platform. The sensing axes of the accelerometers 138 and 139 will be mutually orthogonal and level. As illustrated in Fig. 7 the gyroscope 136 is substantially similar, except for orientation, to the gyroscope 20 of Fig. 1. The rotor case 140 is pivoted about the y axis to inner gimbal 141 which carries the flat coils of the x axis pickoff 142 and x axis torquer 143. The flat coil of the y axis pickoff 144 and y axis torquer 145 are carried by the y axis pivot of rotor case 140. The inner gimbal 141 is pivoted about x to the outer case 137 which in turn is pivoted about z in pitch gimbal 146 carried for pitch motion about the Y axis in roll gimbal 147. A z axis servo motor 148 and synchro 149 are provided as described in connection with Figs. 1 and 2. Gyroscope 150 of the second platform section has its spin axis located along y' axis and similarly includes a rotor case mounted in inner gimbal 151 which is pivoted to outer case or platform section 152 about x axis. The case 152 is provided with three degrees of rotational freedom by its z axis pivotal mounting in pitch gimbal 153 which is pitch pivoted in roll gimbal 147 about axis Y' which is displaced along X axis from axis Y of pitch gimbal 146.

The spherical case 137 of gyroscope 136 is here mounted for azimuth freedom about an axis coincident with the spin axis of the gyroscope which is utilized to stabilize the platform section 137 about the axes X and Y by means of the gyroscope pickoffs, resolver 153' and the platform roll and pitch servo motors 154 and 155 respectively. The signal from y pickoff 144 is fed through the resolver to amplifier demodulators 156 and 157 which provide the roll and pitch gimbal servos with the X and Y components of y axis deviation of case 137 relative to the gyroscope defined axis. The signal from x axis pickoff 142 is fed through resolver 153' to amplifier demodulators 156 and 157 which feed the roll and pitch gimbal servos with the proper X and Y componentss of x axis deviation of the platform section 137 relative to the gyroscope defined x axis. Gyroscope 136 thus stabilizes its platform section about the two horizontal axes X and Y. The pitch axis Y' of platform section 152 is pitch slaved from section 137 by means of a pair of pitch slave links 158, 159 substantially similar to pitch links 82 and 85 of Fig. 2. The platform sections are maintained in proper relative orientation about X axis by means of the common roll gimbal 147.

Gyroscope 150 is utilized for azimuth stabilization only and has its $z$ axis pickoff 160 utilized to provide a signal via amplifier demodulator 161 to azimuth servo motor 162 which rotates case 152 relative to gimbal 153 in azimuth in order to null the detected azimuth deviation. Gyroscope 150 is caged about $x$ axis to its case 152 by means of pickoff 163 which feeds a signal via amplifier demodulator 164 to $z$ axis torquer 165 which effects precession about the $x$ axis to null the detected deviation. Thus, gyroscope 150 stabilizes its platform section in azimuth and is itself slaved about the two orthogonal level axes from the gyroscope 136 whereby the spin axes of the two gyroscopes are maintained at right angles to each other. Platform section 137 is stabilized in azimuth by means of a remote coupling electromechanical servo link comprising azimuth pickoff synchro 165, synchro 149, servo motor 148, and amplifier demodulator 166 which are all substantially similar to the electro-mechanical azimuth slaving servo link shown in Fig. 2. The compensation (for local earth level) for vertical components of the angular velocity of earth rotation and rate of change of longitude are introduced by rotating the rotor of differential synchro 167 at a suitable rate by means of servo motor 168 (energized from the computer) and gearing 169.

An advantage of the configuration of Fig. 6 which is absent from that of Fig. 2 in the introduction of angular velocity compensation as velocity signals rather than torque signals. Since both the level references ($x$ and $y$ axes) are furnished by one gyroscope and the azimuth reference ($z$ axis) by a second and independent gyroscope, it is possible to introduce vertical angular velocity compensation by rotating the differential synchro at a suitable rate and thereby changing the phase relation (the relative azimuth orientation) of the two gyroscopes. Thus, it will be seen that while the spin axes of the two gyroscopes will be maintained at right angles to each other, only the gyroscope 136 has to be rotated in azimuth for vertical angular velocity compensation. As previously explained, in a latitude, longitude navigation system to keep the accelerometers oriented with their sensing axes respectively North-South and East-West, it is necessary to compensate for the vertical component of earth rotation, $\Omega_z$ plus the vertical component of rate of change of longitude, $\Lambda_z$. In the system of Fig. 2 this can be done only by applying a torque to the gyroscopes to effect azimuth precession at the stated rate. In the embodiment of Fig. 6, however, the azimuth gyroscope 150 can be left untorqued and the differential synchro may be driven at the desired angular velocity compensating rate. In the system of Fig. 6, gyroscope 136 still has to be torqued to produce precession in accordance with the horizontal components of earth rate, the horizontal component of rate of change of longitude and the rate of change of latitude. This required precession about the $x$ and $y$ axes may be effected by supplying appropriate signals to the $x$ and $y$ torquers 143 and 145 of gyroscope 136 substantially as described in connection with the signals applied to torquers 116 and 52 respectively. It is to be noted, however, that the required horizontal precession rates are exceedingly small compared with the enormous values of the vertical components of rate of change of longitude which occur at high latitudes and the generation of the required torques, for horizontal axes of precession is much less of a problem. For example, for a vehicle speed of 900 knots the maximum value of latitude rate is 15 degrees per hour and the maximum value of the sum of horizontal components of earth rate and longitude rate is 30 degrees per hour whereas the vertical component of longitude rate would be 150 degrees per hour at a latitude of 85 degrees if the craft were traveling east or west at 900 knots. Thus, it will be seen that in certain situations the ability to receive velocity rates rather than torques may be of exceedingly great importance.

An additional advantage of the arrangement of Fig. 6 is the capability of rapid pre-launching alignment. Consider a conventional autonavigator platform whose normal operating orientation is NSEW. When deactivated, the azimuth orientation may be anything throughout 360°, as much as 180° in error. The rate at which the platform can be aligned is determined by the maximum torque that can be applied to the azimuth gyroscope, which in practice might be 50 to 100 degrees per hour. Thus, situations may exist where excessive time is required to align the platform for launching. In the system of Fig. 6, however, alignment can be accomplished as fast as one can turn the differential synchro 167 since neither of the gyroscopes has to be torqued to bring the accelerometers into NSEW orientation.

Figure 8:
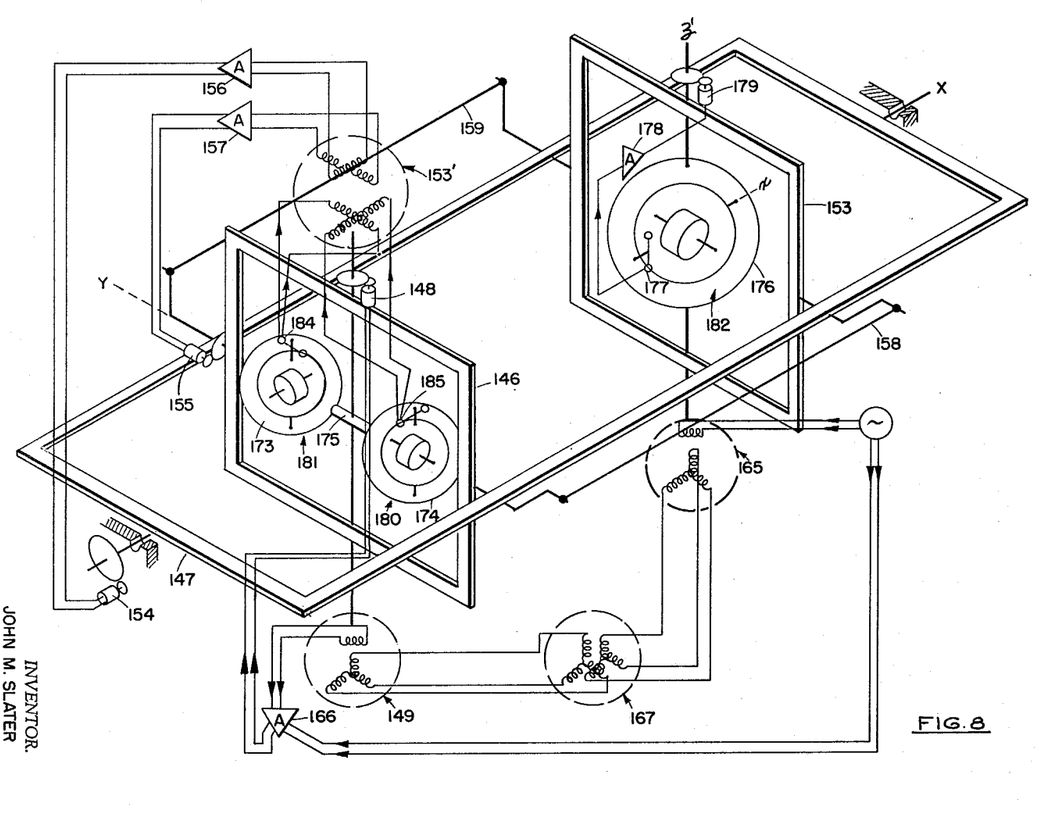
Fig. 8 is a diagrammatic illustration of another embodiment of the invention.
Figure 9:
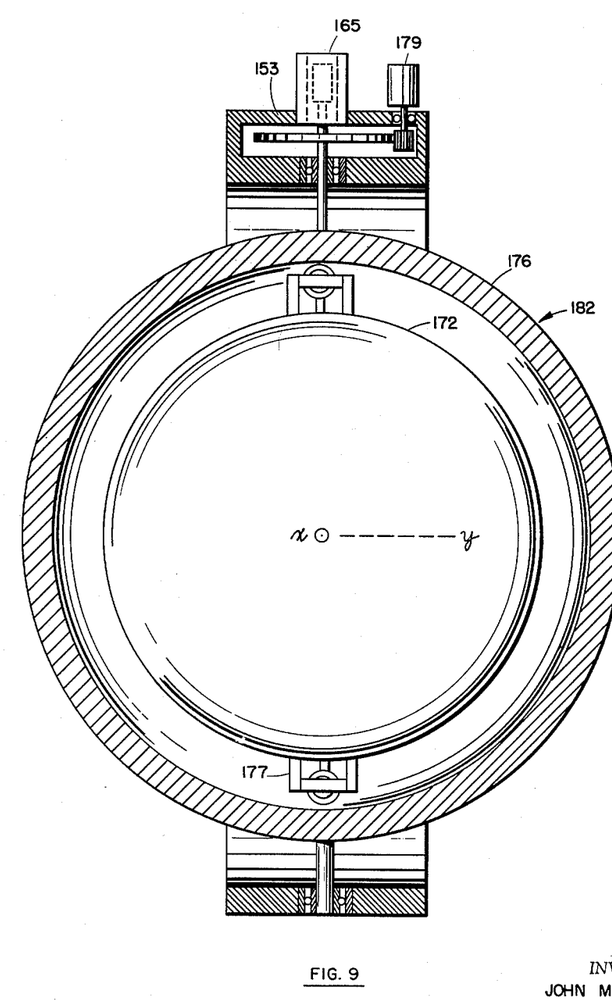
Fig. 9 illustrates an exemplary single axis gyroscope which may be utilized with the embodiment of Fig. 8.

Illustrated in Fig. 8 is an embodiment of the sectional platform of the invention which is based upon the use of single axis gyroscopes entirely. A first platform section is stabilized about $x$ and $y$ axes by single-axis gyroscopes 180 and 181 respectively. The second platform section is stabilized in azimuth by a similar single axis gyroscope 182, the spin axes of all three gyroscopes being maintained in a mutually orthogonal relation by the remote coupling slaving links which may be identical to those described in connection with Fig. 6. A typical single-axis gyroscope such as gyroscope 182, as illustrated in Fig. 9, is substantially similar to the two-axis gyroscope described in Fig. 1 with the omission of the inner gimbal and one of the pickoff and torquer assemblies. The gyroscope rotor is mounted with its spin axis along the $y'$ axis (in the case of gyroscope 182, for example) in the spherical rotor case 172 which is pivoted about $x$ axis to to the outer case 176.

The outer case 173 of gyroscope 181 is rigidly attached to the outer case 174 of the second gyroscope 180 of the first platform section by means of a shaft 175 affixed to each case. The shaft and the two cases thus comprise the first platform section which is pivotally mounted about $z$ axis in pitch gimbal 146. The pitch gimbal as in the embodiment of Fig. 6 is pivoted about the Y axis in a common roll gimbal 147. The pitch gimbal 153 of the second platform section is also mounted for pitch freedom in the common roll gimbal and has pivoted thereto about the azimuth axis the case 176 of the azimuth gyroscope 182. Each single axis gyroscope thus has a single degree of freedom (about its output or precession axis) relative to the case or platform section which it stabilizes about its input axis. Thus, in gyroscope 182 any disturbing torque applied via case or platform section 176 about the azimuth or input axis will be manifested as a precession about the $x$ or output axis of the gyroscope. The precession is manifested as an $x$ axis displacement of the gyroscope relative to case 176 which is sensed by output axis pickoff 177 to feed a signal via amplifier demodulator 178 to azimuth servo motor 179 which rotates or torques the case in a sense to null the input axis disturbing torque. This platform section is thus azimuth stabilized by its gyroscope. Similarly, disturbing torques of the platform section comprising cases 173 and 174 are applied to gyroscopes 181 and 180 about their respective input axes $y$ and $x$ and are manifested as precessions about the gyroscope output axes which precessions are detected by output axis pickoffs 184, 185 to feed via resolver 153' and amplifier demodulators 156, 157 the proper X and Y components to servo motors 154 and 155 in a sense to null the disturbing torques. This platform section is thus directly stabilized about the two horizontal axes. The azimuth, pitch and roll remote slaving may be accomplished by apparatus identical with that disclosed in Fig. 6. As in the embodiment of Fig. 6 the arrangement of Fig. 8 has the advantage of permitting the velocity compensation for vertical components of earth rate and rate of change of longitude ($\Omega_z + \dot{\lambda}_z$) to be performed at the differential synchro 167. It will be readily appreciated that an extension of the single axis stabilization of the arrangement of Fig. 8 may comprise three individual and separately mounted tandem platform sections each stabilized about one of three mutually orthogonal axes by its own particular single axis gyroscope. In such an arrangement, however, the advantages of the sectional platform configuration may be comprised to some extent by the increased complexities of additional remote coupling slaving links which maintain the required orthogonal relation of the several gyroscope spin axes. In such an arrangement with three separately mounted platform sections each section will be remotely stabilized about two axes from two of the other gyroscopes.

Figures 10, 11, 12, 13:
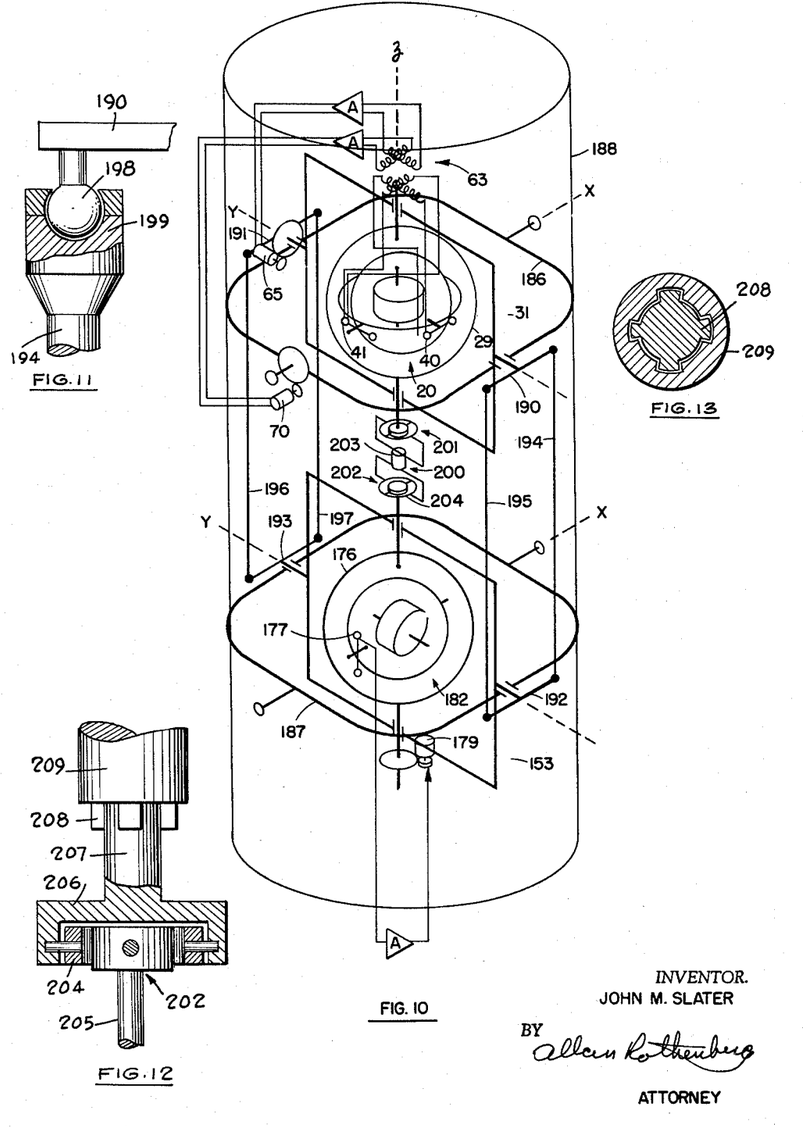
Fig. 10 illustrates a further embodiment of the invention.
Figs. 11, 12 and 13 show details of typical mechanical links.

All of the embodiments shown in Figs. 2, 6, and 8 have the outermost gimbal axis horizontal, and ordinarily disposed along the roll axis of an airplane or the pitch axis of a missile which is to make steep climbs and dives. In some applications and particularly for use as a stable platform on a submarine or other sea-going vessel it may be desirable to have an inertial assembly which is compact laterally and elongated vertically. In a submarine particularly, floor space is extremely limited although a resonable vertical extension may be tolerated. The sectional platform of the present invention is readily adaptable to such a configuration, an exemplary form of which is illustrated in Fig. 10. In such an arrangement the problem of slaving one gyroscope to the other is simplified since mechanical links may be used as remote coupling slaving links for all three axes thus obviating the need for a servo slaving system such as the azimuth slaving arrangement disclosed in the previously described embodiments. The arrangement illustrated in Fig. 10 is somewhat similar to that of Fig. 2 with the assembly turned on end (rotated through 90° in pitch) and a universal joint and shaft assembly substituted for the azimuth servo slaving link. The outer case 29 of two-axis gyroscope 20 is again mounted for azimuth freedom in a pitch gimbal 31 while the second platform section or outer case 176 of single-axis gyroscope 182 is mounted for azimuth freedom in pitch gimbal 153. Each pitch gimbal in this arrangement is individually mounted for pitch freedom in its own roll gimbal 186, 187 which are individually mounted for relative movement about parallel roll axes in a case or frame 188 shown as being of cylindrical configuration and fixedly carried by the craft to be navigated. The first platform section 29 is stabilized by two-axis gyroscope 20 by means of its pickoffs 40 and 41 which feed stabilizing signals through resolver 63 to the roll and pitch gimbal servo motors 70 and 65. The single axis gyroscope 182 having an azimuth input axis stabilizes its case 176 as described in connection with Fig. 8 by means of its output axis pickoff 177 and azimuth servo motor 179. Platform section 176 is roll and pitch stabilized from the roll and pitch gimbals 186 and 31 of platform section 29 by means of mechanical linkage comprising arms 190, 191 fixed to the pitch pivot of gimbal 31, arms 192, 193 fixed to the pitch pivot of gimbal 153 and two pairs of rigid links 194, 195 and 196, 197. Each of arms 194, 195, 196, 197 is pivoted for universal movement at each of the ends thereof to an associated end of the arms 190, 192, 191 and 193. As disclosed in Fig. 11, the universal connection between link 194 and arm 190 which is similar to the other seven universal connections of the roll and pitch slaving links, may comprise a ball 198 fixed to arm 190 and received in a spherical socket formed by a cup 199 fixed to an end of the slaving link 194.

The first platform section comprising outer case 29 of two-axis gyroscope 20 is azimuth slaved from the case 176 of single axis gyroscope 182 via a sliding universal joint assembly 200 in order to maintain the orthogonal relation between the gyroscope spin axes. The azimuth slaving joint assembly comprises a pair of universal joints 201 and 202 connected respectively to case 29 and case 176 and connected for translational azimuth motion relative to each other by splined joint 203.

As illustrated in Fig. 12, universal joint 202, for example, may comprise a first gimbal 204 to which azimuth shaft 205 of case 176 is pivoted for freedom in roll. Gimbal 204 is pivoted for pitch freedom in the bifurcated end 206 of shaft 207 which has splines 208 fixed to the other end thereof. The splines 208 are received in mating grooves formed in a hollow shaft 209 which is fixed to the outer gimbal of the upper universal joint 201.

It is to be understood that in each of the arrangements of Figs. 6, 8 and 10 there may be provided any desired arrangement of accelerometers, roll, pitch and azimuth pickoffs, as described in connection with Figs. 2, 3 and 4. Furthermore, although several specific embodiments of the invention have been described, it should be readily appreciated that other arrangements of sectional stable platforms are readily available in accordance with the concepts of the present invention.

There have been described several sectional stable platforms utilizing substantially conventional components and inherently adapted to afford any number of different physical arrangements of the components thereof. The novel and improved results are achieved by grouping the inertial elements of a multiple axis platform in a plurality of separate and relatively movable subassemblies or platform sections, each of which is directly stabilized by one or more individual gyroscopes mounted thereon. The mutually remote and independently mounted gyroscopes and platform sections are maintained in a predetermined relative orientation by remote coupling slaving links to thereby maintain the desired relative orientation of the several platform sections. Thus, each platform section which is directly stabilized about less than three axes is effectively stabilized about one or more additional axis by another remotely located gyroscope.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Navigation apparatus comprising a sectional attitude reference platform including first and second relatively movable platform sections mounted with two degrees of angular freedom relative to each other, gyroscopic means mounted on said first section with two degrees of angular freedom relative thereto, servo follow up means responsive to said gyroscopic means for stabilizing said first section about each of two mutually orthogonal axes of a coordinate system having a predetermined relation to inertial space, means for stabilizing said second section about an axis perpendicular to both said first mentioned axes, and slaving means for maintaining a predetermined relative orientation of said platform sections.

2. An inertial navigator comprising a stable platform having first and second platform sections, means mounting said first section for motion about a first pair of axes, means mounting said second section for motion about a second pair of axes displaced from said first pair, first and second accelerometers having mutually orthogonal sensing axes carried by said platform, first stabilizing means for stabilizing said first accelerometer about first and second mutually orthogonal axes, second stabilizing means for establishing a stable reference about a third axis orthogonal to said first and second axes, slaving means for maintaining a predetermined relative orientation between said stabilizing means, and means including said first and second stabilizing means for stabilizing said second accelerometer about said third axis and one of said first and second axes.

3. An inertial reference system comprising a sectional attitude reference platform including first and second relatively movable stabilized platform sections mounted with two degrees of angular freedom relative to each other, at least one of said sections including a gimbal mounted frame and gyroscopic means mounted thereto with two degrees of angular freedom relative to the frame for effecting stabilization thereof, and remote coupling means for maintaining a predetermined relative orientation of said sections.

4. A stable platform comprising a pair of relatively movable platform sections, means mounting said sections for motion about a first axis, means mounting one of said sections for motion about second and third axes, means mounting the other of said sections for motion about fourth and fifth axes parallel to and linearly displaced from said second and third axes respectively, gyroscopic means mounted on said one section with two degrees of freedom relative thereto for stabilizing said one section about two of the axes thereof, means for stabilizing said other section about at least one of the axes thereof, and slaving means for controlling the relative orientation of said sections.

5. A stable platform comprising a pair of relatively movable platform sections, means mounting said sections for motion about a first axis, means mounting one of said sections for motion about second and third axes, means mounting the other of said sections for motion about fourth and fifth axes parallel to and linearly displaced from said second and third axes respectively, means for stabilizing said one section about two of the axes thereof, means for stabilizing said other section about at least one of the axes thereof, and slaving means for controlling the relative orientation of said sections.

6. The platform of claim 5 wherein said stabilizing means includes a two-axis gyroscope on one of said sections, a gyroscope on the other of said sections, means respective to said gyroscopes for controlling the orientation of said one section about said second and third axes, means responsive to said other section gyroscope for controlling the orientation of said other section about said first axis, means for caging said other section gyroscope to said other section about said fifth axis, said slaving means comprising link means coupling said second and fourth axes, and servo means coupling said third and fifth axes.

7. The platform of claim 5 wherein said stabilizing means includes first and second gyroscope means carried by respective platform sections, means responsive solely to said first gyroscopic means for controlling the orientation of one section about said second and third axes, means responsive to said second gyroscopic means for controlling the orientation of said other section about said first axis, means for caging said second gyroscopic means to said other section about said first axis, said slaving means comprising mechanical linkage coupling said second and fourth and said third and fifth axes, and a sliding joint and universal assembly coupling said sections about said first axis.

8. The platform of claim 5 wherein said stabilizing means includes first and second gyroscopic means carried by respective platform sections, means responsive solely to said first gyroscopic means for controlling the orientation of said one section about said first and second axes, means responsive to said second gyroscopic means for controlling orientation of said other section about said fifth axis, means for caging said second gyroscopic means to said other section about said first axis, said slaving means comprising a servo system for rotating said one section about said third axis in response to rotation of said other section about said fifth axis, and means interposed in said servo system for effecting relative rotation of said sections about said third and fifth axes respectively.

9. The platform of claim 8 wherein said first gyroscopic means comprises a pair of single axis gyroscopes having input axes orthogonal to each other and to said third axis, said second gyroscopic means comprising a single axis gyroscope having an input axis disposed along said fifth axis.

10. A stable platform comprising a pair of platform sections, means mounting one of said sections for motion about each other of the axes of a first set of coordinate axes, means mounting the other of said sections for motion about each of the axes of a second set of coordinate axes, said second set being linearly displaced from said first set, means for stabilizing said first section about at least one axis of said first set, means for stabilizing said second section about at least one axis of said second set, and orientation slaving means interconnecting said sections for maintaining a predetermined relative orientation of said sections.

11. A stable platform comprising a pair of platform sections, means mounting one of said sections for motion about each of the axes of a first set of coordinate axes, means, mounting the other of said sections for motion about each of the axes of a second set of coordinate axes, said second set being linearly displaced from said first set, means for stabilizing said first section about two axes of said first set, means for stabilizing said second section about one axis of said second set, orientation slaving means interconnecting said sections for maintaining a predetermined relative orientation of said sections, said one axis of said second set being parallel to a third axis of said first set, and means for rotating both of said sections to maintain said sections at local earth level and in a predetermined azimuth orientation.

12. A stable platform comprising a first platform section mounted for motion about a first set of coordinate axes, a two-axis gyroscope carried by said section with two degrees of freedom relative thereto, a servo means for maintaining alignment of said section with said gyroscope, an accelerometer mounted to said section, a second platform section mounted for motion about a second set of axes displaced from said first set, a second gyroscope carried by said second section, servo means for maintaining alignment of said second section with said second gyroscope, a second accelerometer mounted to said platform, slaving means for maintaining a predetermined relative orientation of said first and second sections, and means for effecting rotation of said gyroscopes to maintain a spatial orientation of said platform sections having a predetermined relation to inertial space.

13. A stable platform comprising a first platform section gimbal mounted for motion about a first set of coordinate axes, a two-axis gyroscope carried by said section with two degrees of freedom relative thereto, servo means for maintaining alignment of said section with said gyroscope, an accelerometer mounted to said section, a second platform section gimbal mounted for motion about a second set of axes displaced from said first set, a second two axis gyroscope carried by said second section with two degrees of freedom relative thereto, servo means for maintaining alignment of said second section with said second gyroscope, a second accelerometer mounted to said second section, slaving means for maintaining a predetermined relative orientation of said first and second sections, and means for torquing said gyroscopes to maintain a spatial orientation of said platform sections having a predetermined relation to inertial space.

14. A stable platform comprising a plurality of individually stabilized platform sections mounted for movement relative to one another, about each axis of a plurality of mutually displaced sets of axes, orientation slaving links interconnecting said sections whereby said platform is spatially stabilized and said platform sections are maintained in a predetermined orientation relative to one another, one of said links including an azimuth servo system for effecting rotation of one of said sections in azimuth in accordance with the azimuth position of the other of said sections, and differential means interposed in said servo system for changing the relative azimuth orientation of said sections in accordance with a rotational input to said differential means.

15. In combination; a pair of gyroscope-accelerometer-gimbal assemblies; each assembly comprising a two-axis gyroscope with horizontal spin axis gimbaled for freedom about three mutually orthogonal axes, an accelerometer stabilized by the gyroscope and having its sensing axis parallel to said spin axis, and integrating and torque-generating means for applying to the gyroscope, about a vertical axis, a torque which is a function of the first time integral of acceleration sensed by said accelerometer, whereby the gyroscope-accelerometer assembly functions as a pendulous system of period determined by the scale factor of the integrating and generating means; and means for maintaining the gyroscope spin axis and the accelerometer sensing axis of one assembly in quadrature relation to the corresponding axes of the other assembly, whereby a two-axis pendulous system is provided.

16. The combination of claim 15 wherein said integrating and generating means includes means for applying torque of a value such as to give the system a period T substantially equal to $2\pi R/g^{\frac{1}{2}}$ where R is radius from the center of the earth and $g$ is acceleration of gravity at the assemblies.

17. An inertial system comprising a two-axis gyroscope gimbaled about three axes and having a normally vertical spin axis, a pair of accelerometers stabilized by the gyroscope and having mutually orthogonal horizontal sensing axes, integrating and torque-generating means responsive to said accelerometers for supplying torques to the gyroscope which are functions of the first time integral of acceleration components along the horizontal sensing axes of the accelerometers, whereby a two-axis pendulous system is established, an azimuth-stabilizing gyroscope gimbaled for three degrees of freedom, means responsive to said two-axis gyroscope for stabilizing the azimuth axis of said azimuth gyroscope in vertical orientation, and means responsive to said azimuth gyroscope for stabilizing the two-axis gyroscope in azimuth.

18. The combination of claim 17 wherein said integrating and generating means includes means for applying torque of a value such as to give the system a period T substantially equal to $2\pi(R/g)^{\frac{1}{2}}$ where R is radius from the center of the earth and $g$ is acceleration of gravity at the system.

19. The platform of claim 10 wherein said means for stabilizing one of said sections comprises a gyroscope thereon having a vertically disposed spin axis.

20. The platform of claim 19 wherein the means for stabilizing the other of said sections comprises a gyroscope thereon having a horizontally disposed spin axis.

References Cited in the file of this patent
UNITED STATES PATENTS

| | | |
|---|---|---|
| 2,637,914 | Rawlings | May 12, 1953 |
| 2,729,108 | Vacquier et al. | Jan. 3, 1956 |
| 2,770,452 | Miller | Nov. 13, 1956 |
| 2,801,544 | Wagner | Aug. 6, 1957 |

UNITED STATES PATENT OFFICE
CERTIFICATION OF CORRECTION

Patent No. 2,958,522 November 1, 1960

John M. Slater

It is hereby certified that error appears in the above numbered patent requiring correction and that the said Letters Patent should read as corrected below.

Column 8, line 74, for "Λ" read -- $\dot{\Lambda}$ --; column 9, line 10, for "λ and Λ" read -- $\dot{\lambda}$ and $\dot{\Lambda}$ --; column 13, line 11, for "comprised" read -- compromised --; column 15, line 38, for "respective" read -- responsive --; column 16, line 8, strike out "other"; line 21, after "means" strike out the comma; line 68, after "another" strike out the comma.

Signed and sealed this 30th day of May 1961.

(SEAL)
Attest:

ERNEST W. SWIDER
Attesting Officer

DAVID L. LADD
Commissioner of Patents